United States Patent
Aschenbrenner et al.

(10) Patent No.: US 8,705,141 B2
(45) Date of Patent: Apr. 22, 2014

(54) METHOD AND SYSTEM FOR EFFICIENTLY PRINTING SIMPLE DATA USING A COMPLEX PAGE DATA STREAM

(75) Inventors: Jean M. Aschenbrenner, Boulder, CO (US); Joseph S. Czyszczewski, Longmont, CO (US); Nenad Rijavec, Longmont, CO (US); Arthur R. Roberts, Boulder, CO (US); James T. Smith, II, Boulder, CO (US)

(73) Assignee: Ricoh Production Print Solutions, Boulder, CO (US)

( * ) Notice: Subject to any disclaimer, the term of this patent is extended or adjusted under 35 U.S.C. 154(b) by 2260 days.

(21) Appl. No.: 10/892,848

(22) Filed: Jul. 16, 2004

(65) Prior Publication Data

US 2006/0012816 A1    Jan. 19, 2006

(51) Int. Cl.
*H04N 1/40*   (2006.01)
*G06F 3/12*   (2006.01)

(52) U.S. Cl.
USPC ....... 358/3.28; 358/1.13; 358/1.18; 358/1.15; 358/1.9; 358/2.1; 382/298

(58) Field of Classification Search
USPC .............. 358/1.13, 1.18, 1.15, 1.9, 2.1, 3.27; 382/298
See application file for complete search history.

(56) References Cited

U.S. PATENT DOCUMENTS

| | | | |
|---|---|---|---|
| 5,404,435 A | 4/1995 | Rosenbaum | |
| 5,615,015 A * | 3/1997 | Krist et al. | 358/296 |
| 5,713,032 A | 1/1998 | Spencer | |
| 6,011,905 A | 1/2000 | Huttenlocher et al. | |
| 6,483,524 B1 | 11/2002 | Petchenkine et al. | |
| 6,672,212 B1 * | 1/2004 | Ferlitsch | 101/484 |
| 2002/0113979 A1 * | 8/2002 | Rahgozar et al. | 358/1.6 |
| 2002/0140958 A1 * | 10/2002 | Lester | 358/1.13 |
| 2002/0186409 A1 | 12/2002 | Laverty et al. | |
| 2003/0039409 A1 * | 2/2003 | Ueda | 382/298 |
| 2003/0090709 A1 | 5/2003 | Rijavec | |
| 2003/0090714 A1 | 5/2003 | Sandhaus | |
| 2003/0112308 A1 | 6/2003 | Silverbrook et al. | |
| 2004/0125389 A1 * | 7/2004 | Tokura et al. | 358/1.9 |

* cited by examiner

*Primary Examiner* — Quang N Vo
(74) *Attorney, Agent, or Firm* — Duft Bornsen & Fettig LLP

(57) ABSTRACT

A method and system for printing simple data utilizing a raster image processor in a computer system is disclosed. The raster image processor is configured for use with a complex data stream corresponding to at least one complex page description language. The method and system include embedding at least one control structure in the complex data stream. The control structure(s) are for informing the raster image processor of the simple data. The method and system also include converting the simple data into a printable format based on the at least one control structure and without using the complex page description language to convert a portion of the complex data stream corresponding to the simple data into the printable format. The method and system also include converting a remaining portion of the complex data stream into the printable format using the complex page description language.

18 Claims, 6 Drawing Sheets

METHOD AND SYSTEM FOR EFFICIENTLY PRINTING SIMPLE DATA USING A COMPLEX PAGE DATA STREAM

FIELD OF THE INVENTION

The present invention relates to computer systems, and more particularly to a method and system for efficiently printing simple data using a complex page description language data stream.

BACKGROUND OF THE INVENTION

FIG. 1 depicts a conventional system 10 for printing conventional complex data streams. The system 10 is also generally used for extremely high speed printing, such as in printing a run of books. A conventional complex data stream is one which is associated with a complex page description language (PDL) and which is used in printing data in the complex PDL. As used herein, a complex PDL includes languages such as PostScript, PDF, and PCL by Hewlett Packard, which allow data to be viewed and manipulated on a page basis. The conventional system 10 includes a conventional generator 20, a conventional raster image processor (RIP) 30, and a conventional printer 40. The conventional generator 20 receives data in the complex PDL. The conventional generator 20 generates the conventional complex data stream to be printed based upon the data provided in the complex PDL. The complex data stream output by the conventional generator 20 is also in the complex PDL. The complex data stream is to be printed and is provided by the conventional generator 20 to the conventional RIP 30. In addition, some conventional generators 20 may add other information to the complex data stream. For example, a conventional generator 20 by International Business Machines (IBM) allows for grey scale using TIFF images. In such a conventional generator 20, a private tag and a device independent grey scale image are added to the complex data stream. The private tag corresponds to the device independent image, such as a photograph, that should be printed as part of the data stream. A device specific image is also placed in the complex data stream. A conventional RIP 30 that is proprietary to IBM can recognize the private tag and is capable of locating the device independent image and printing the image in grey scale using the information associated with the private tag. A conventional RIP 30 that is not proprietary to IBM can still be used in printing the complex data stream, but generally does not recognize the private tag and thus does not allow for printing the TIFF image in grey scale.

The conventional RIP 30 converts the complex data stream to a printable format. As used herein, a printable format is a format that can be printed more efficiently or that is tuned to a particular printer, such as the conventional 40. For example, one printable format used by IBM is a mixed object data content architecture (MODCA), which provides images in image object data content architecture (IOCA). However, other printable formats may be used. Thus, for example, the RIP 30 may convert a PDF and/or PostScript file (the complex data stream) to the MODCA and IOCA data. The printable format can then be provided from the conventional RIP 30 to the conventional printer 40. Thus, the conventional RIP 30 can be viewed as a file conversion program that converts data between the complex PDL in which the complex data stream is expressed and the printable format.

Although the conventional system 10 functions well for its intended purpose, one of ordinary skill in the art will readily recognize that the conventional system 10 may be inefficient in converting certain types of data in the complex data stream to the printable format. In particular, one of ordinary skill in the art will readily realize that the conventional system 10 prints simple data slowly. Simple data includes data, particularly scanned images, that are generally not greatly modifiable using the complex PDL and which are generally printed without further image processing. As used herein, simple data includes data that cannot be substantially altered using the tools of the complex PDLs, such as scanned images that are stored in the PDL. Thus, many of the tools available through the complex PDL are not used with the simple data. For example, as mentioned above, a user of the conventional system 10 may desire to print short runs of books at a high speed. The original copy of the book is scanned in. Thus, the complex data stream provided and printed using the conventional system includes a series of scanned images. The content of individual pages is not modifiable using the complex PDL, is generally printed without further processing, and is, therefore, simple data. However, the simple data may be stored in the complex PDL because the formats are ubiquitous and powerful. In order to print the simple data in the complex data stream, the conventional RIP 30 processes the data and converts between the complex PDL and the printable format. When printing the complex data stream including this simple data, therefore, the simple data may be printed over ten times more slowly than, for example, a TIFF image of the simple data.

Accordingly, what is needed is a system and method for more rapidly and efficiently printing simple data from a complex data stream. The present invention addresses such a need.

SUMMARY OF THE INVENTION

The present invention provides a method and system for printing simple data utilizing a raster image processor in a computer system. The raster image processor is configured for use with a complex data stream corresponding to at least one complex page description language. The method and system comprise embedding at least one control structure in the complex data stream. The control structure(s) are for informing the raster image processor of the simple data. The control structure(s) may also be ignored by a raster image processor that is not configured to recognize the control structure(s). The method and system also use the raster image processor to convert the simple data into a printable format based on the at least one control structure and without using the complex page description language to convert a portion of the complex data stream corresponding to the simple data into the printable format. The method and system also include converting a remaining portion, if any, of the complex data stream into the printable format using the complex page description language.

According to the system and method disclosed herein, the present invention provides a method and system for more efficiently printing simple data from a complex data stream.

DETAILED DESCRIPTION OF THE INVENTION

The present invention relates to an improvement in printing of simple data. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown, but is to be accorded the widest scope consistent with the principles and features described herein.

The present invention provides a method and system for printing simple data utilizing a raster image processor in a computer system. The raster image processor is configured for use with a complex data stream corresponding to at least one complex page description language. The method and system comprise embedding at least one control structure in the complex data stream. The control structure(s) are for informing the raster image processor of the simple data. The method and system also use the raster image processor to convert the simple data into a printable format based on the at least one control structure and without using the complex page description language to convert a portion of the complex data stream corresponding to the simple data into the printable format. The method and system also include converting a remaining portion, if any, of the complex data stream into the printable format using the complex page description language.

The present invention will be described in terms of a particular computer system having certain components. However, one of ordinary skill in the art will readily recognize that this method and system will operate effectively for other computer system having different and/or additional components performing analogous functions.

Figure 1:
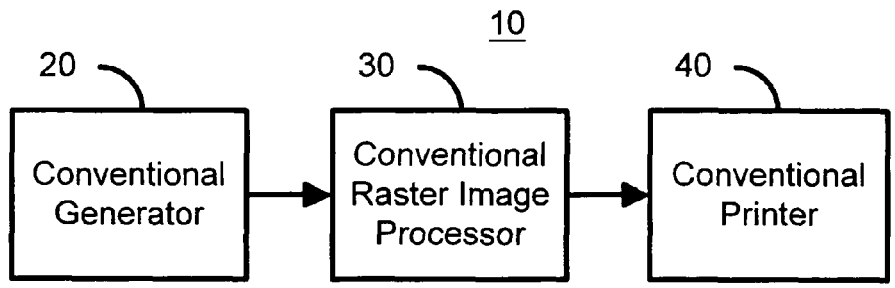
FIG. 1 is a diagram of a conventional system for printing complex data streams.
Figure 2:
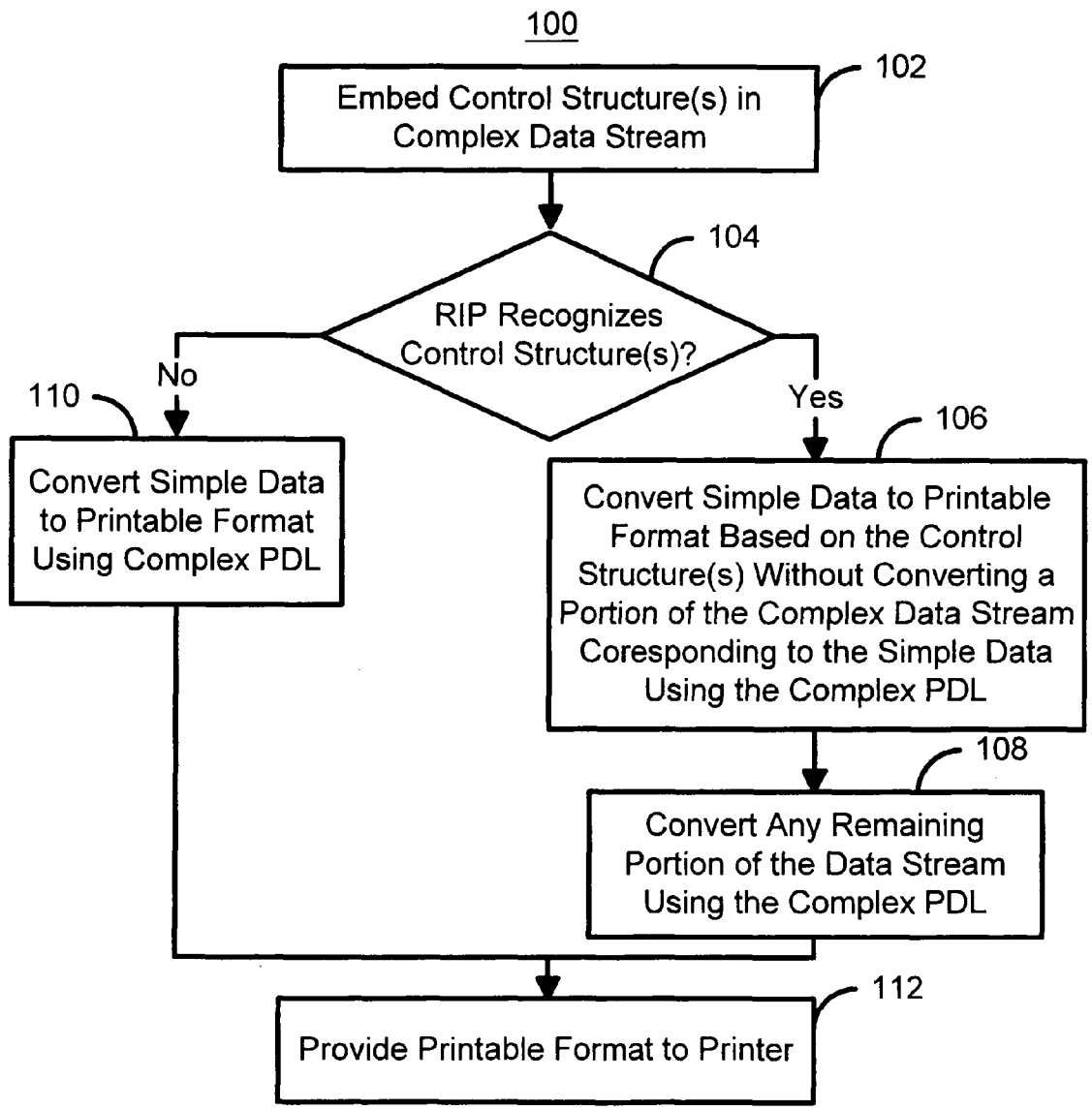
FIG. 2 is a high-level flow chart depicting one embodiment of a method in accordance with the present invention for printing simple data in a complex data stream.

To more particularly illustrate the method and system in accordance with the present invention, refer now to FIG. 2, depicting a high-level flow chart of one embodiment of a method 100 in accordance with the present invention for printing simple data in a complex data stream. The method utilizes a raster image processor (RIP) that is configured for use with a complex data stream. The RIP is configured for use with a complex data stream that is preferably provided using a generator as described below. The complex data stream corresponds to a complex PDL. Furthermore, the simple data is to be printed using the complex data stream. One or more control structures are embedded in the complex data stream, via step 102. The control structures are used to inform the RIP of the simple data. It is determined whether the RIP recognizes the control structures, via step 104. If so, then the RIP converts the simple data into a printable format based on the at least one control structure, via step 106. In converting the simple data in step 106, the RIP does not use the complex PDL to convert a portion of the complex data stream corresponding to the simple data into the printable format. As a result, processing using the complex PDL is avoided for the simple data. In one embodiment, a remaining portion of the complex data stream, if any, may be converted into the printable format using the complex page description language, via step 108. However, if the method 100 is used for a document containing only simple data, then the step 108 may be omitted. If the control structure is not recognized, then the complex data stream is converted into the printable format using the complex PDL, in a conventional manner, via step 110. The printable format can then be provided to a printer, via step 112.

Using the method 100, the simple data can be printed more efficiently. Because the simple data need not be converted using the complex PDL, processing is simplified. The method 100 provides the greatest benefit when the simple data comprises the vast majority of the data in the complex data stream. For example, in the case of printing of a scanned book in which virtually all of the complex data stream is simple data, printing speed is greatly increased. However, the method 100 can be used when smaller portions of the complex data stream are made up of simple data. For example, the method 100 can be used when individual pages consist of simple data. Thus, individual pages being printed are converted into a printable format using step 106, while the remainder of the document is converted, generally in a conventional manner, using step 108. In such an embodiment, the printing efficiency may still be increased.

Figure 3:
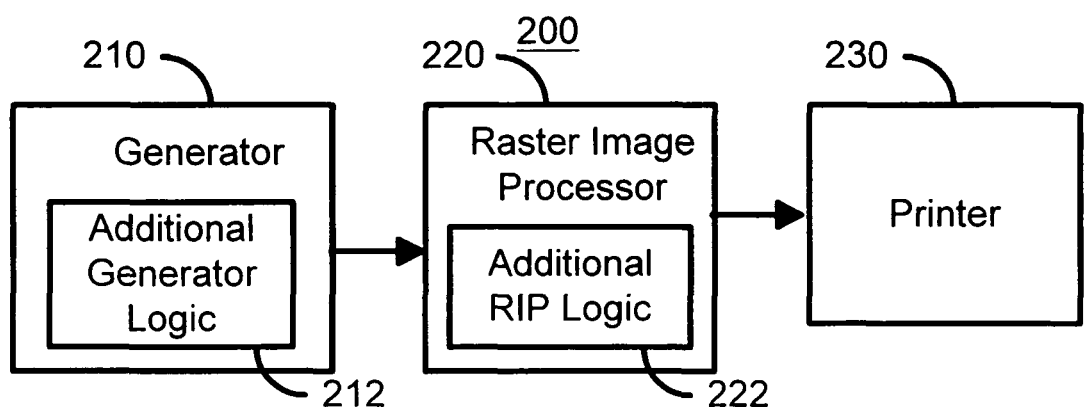
FIG. 3 is a high-level block diagram depicting one embodiment of a system in accordance with the present invention for printing simple data in a complex data stream.

FIG. 3 is a high-level block diagram depicting one embodiment of a system 200 in accordance with the present invention for printing simple data in a complex data stream. The system 200 can be viewed as part of a larger computer system and is preferably used to implement the method 100, as well as the methods 120, 140, 160, and 180, described below. The system 200 includes a generator 210, a RIP 220, and preferably a printer 230. The generator 210 may include logic 212 for providing a portion of the complex data stream related to the simple data. For example, in some embodiments, the logic 212 is used to provide the control structures in the complex data stream. The RIP 220 includes logic 222 that is used in converting the complex data stream. In particular, the logic 222 is used in converting the simple data into the printable format, for example in step 106 of the method 100. In alternate embodiment, the logic 222 may be used to provide the control structure(s), as described below. Furthermore, the system 200, as well as the larger computer system, may include other components that are not shown. For example, the computer system typically includes one or more processors (not shown) and at least one memory (not shown).

Figure 4:
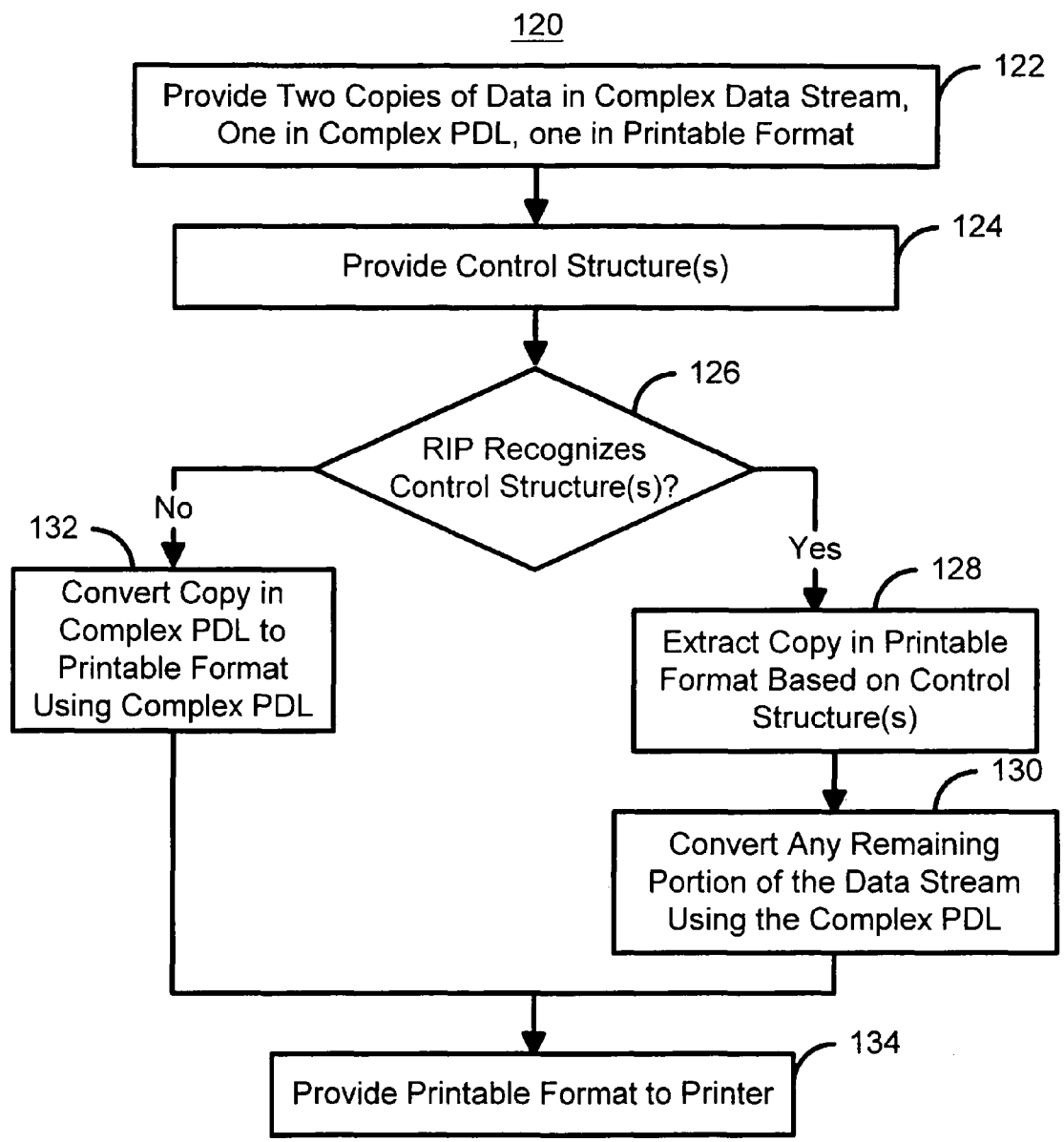
FIG. 4 is a more detailed flow chart depicting a first embodiment of a method in accordance with the present invention for printing simple data in a complex data stream.

FIG. 4 is a more detailed flow chart depicting a first embodiment of a method 120 in accordance with the present invention for printing simple data in a complex data stream. The method 120 is one embodiment of the method 100 described in FIG. 2. In addition, the method 120 can be implemented using the system 200. Referring to FIGS. 3 and 4, the method 120 is also preferably provided for each set of simple data provided to the generator 210 for printing. Two copies of the simple data are provided in the complex data stream, via step 122. The two copies of the simple data are preferably provided by the logic 210 in the generator 210. The first copy of the data is in the complex page description language. Thus, the complex data stream including the first copy is essentially a conventional complex data stream. The second copy of the simple data is in the printable format for the desired RIP 220. For example, the second copy may be in MODCA, which places images in an IOCA format, for an IBM proprietary RIP. Particularly when the data to be printed is essentially all simple data, the first and second copies can be considered to be separate data streams which together make up the complex data stream. In addition, one or more control structures are also embedded in the complex data stream, via step 124. The control structures inform the desired RIP 220 of the second copy of the data. For example, the control structures may be provided using comments or, particularly in PostScript or PDF, private dictionaries. Key words defined in the private dictionaries would inform the RIP 220 of the second copy of the simple data.

It is determined whether the control structure(s) are recognized by the RIP being used, via step 126. If so, the RIP 220 that is capable of printing the simple data more efficiently is being used. Consequently, the second copy of the data is extracted by the RIP 220, via step 128. If any image processing has been requested, then the RIP 220 may also perform the processing in step 128. Remaining portions of the complex data stream to be printed, if any, are converted to the printable format, via step 130. Step 130 may be performed using conventional methods of converting complex data streams in a complex PDL to a printable format. If the control structure(s) were not recognized, then the RIP being used is a conventional RIP, such as the conventional RIP 30. Consequently, the first copy of the simple data is converted to a printable format in a conventional manner, via step 132. In either case, the printable version of the simple data, as well as any other data, are provided to the printer 230, via step 134.

Thus, the method 120 allows the simple data to be printed more rapidly. Furthermore, the method 120 is relatively simple to implement both in the generator 210 and the Rip 220. However, because two copies of the data being printed are used, the length of the data stream is approximately doubled. The method 120 provides the greatest benefit when the simple data comprises the vast majority of the data in the complex data stream, as in the case of printing a scanned book. However, the method 120 can be used when smaller portions of the complex data stream, such as one or more individual pages, are made up of simple data.

Figure 5:
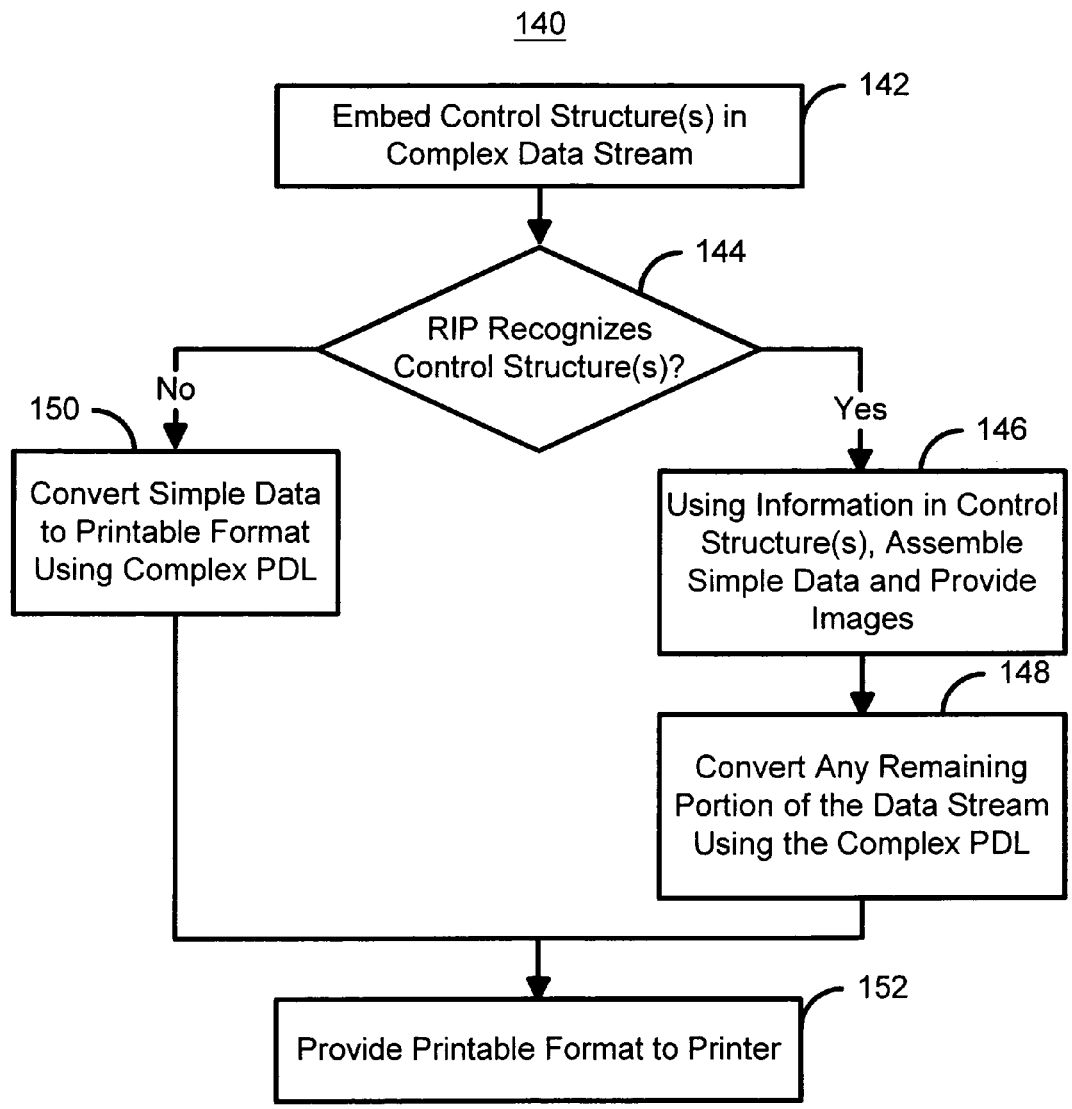
FIG. 5 is a more detailed flow chart depicting a second embodiment of a method in accordance with the present invention for printing simple data in a complex data stream.

FIG. 5 is a more detailed flow chart depicting a second embodiment of a method 140 in accordance with the present invention for printing simple data in a complex data stream. The method 140 is one embodiment of the method 100 described in FIG. 2. In addition, the method 140 can be implemented using the system 200. Referring to FIGS. 3 and 5, the method 140 essentially employs fragmentary embedding for more efficiently printing the simple data. The generator 210, preferably the additional logic 212, provide control structure(s) in the complex data stream, via step 142. The control structures inform the RIP 220 of where the simple data resides in the computer system 200, and how to form the images from the stored simple data. For example, the control structures may indicate where in the memory (not shown) of the computer system simple data resides, how to decompress the simple data if it is stored in a compressed form, how to construct the tiles making up each image, and whether the tiles are to be offset, scaled, and/or rotated. The control structures may also indicate the priority of data, mixing rules, how and whether transparency masks are to be used or combined. The control structures may also point to certain data in the complex PDL that is within the complex data stream. The control structures may be provided using private dictionaries in which information corresponding to key words is defined.

It is determined whether the RIP recognizes the control structures, via step 144. If so, then the simple data is assembled from the specified locations and images formed using the information provided through the control structures, via step 146. Step 146 may thus include obtaining the data from the specified locations, optionally decompressing data if required, placing the tiles at the appropriate offset for each image, and scaling or rotating some or all of the tiles. Remaining portions of the complex data stream to be printed, if any, are converted to the printable format, via step 148. Step 148 may be performed using conventional methods of converting complex data streams in a complex PDL to a printable format. If the control structure(s) were not recognized, then the RIP being used is a conventional RIP, such as the conventional RIP 30. Consequently, the complex data stream including the simple data is converted to a printable format in a conventional manner, via step 150. In either case, the printable version of the simple data, as well as any other data, are provided to the printer 230, via step 152.

The method 140 allows for simple data to be printed more quickly, particularly where the printable formats and complex PDL used are optimized. The method 140 provides the greatest benefit when the simple data comprises the vast majority of the data in the complex data stream, as in the case of printing a scanned book. However, the method 140 can be used when smaller portions of the complex data stream, such as one or more individual pages, are made up of simple data. The method 140 is also relatively flexible and can be relatively easily adapted to different formats and complex PDLs as well as different types of simple data. Furthermore, the length of the complex data stream is not greatly increased by using the method 140. In addition, the changes to the conventional generator 20 and the conventional RIP 30 to provide the generator 210 and the RIP 220 are relatively minor. Note, however, that the RIP 220 does perform more processing than for the method 140, for example using the additional logic 222.

Figure 6:
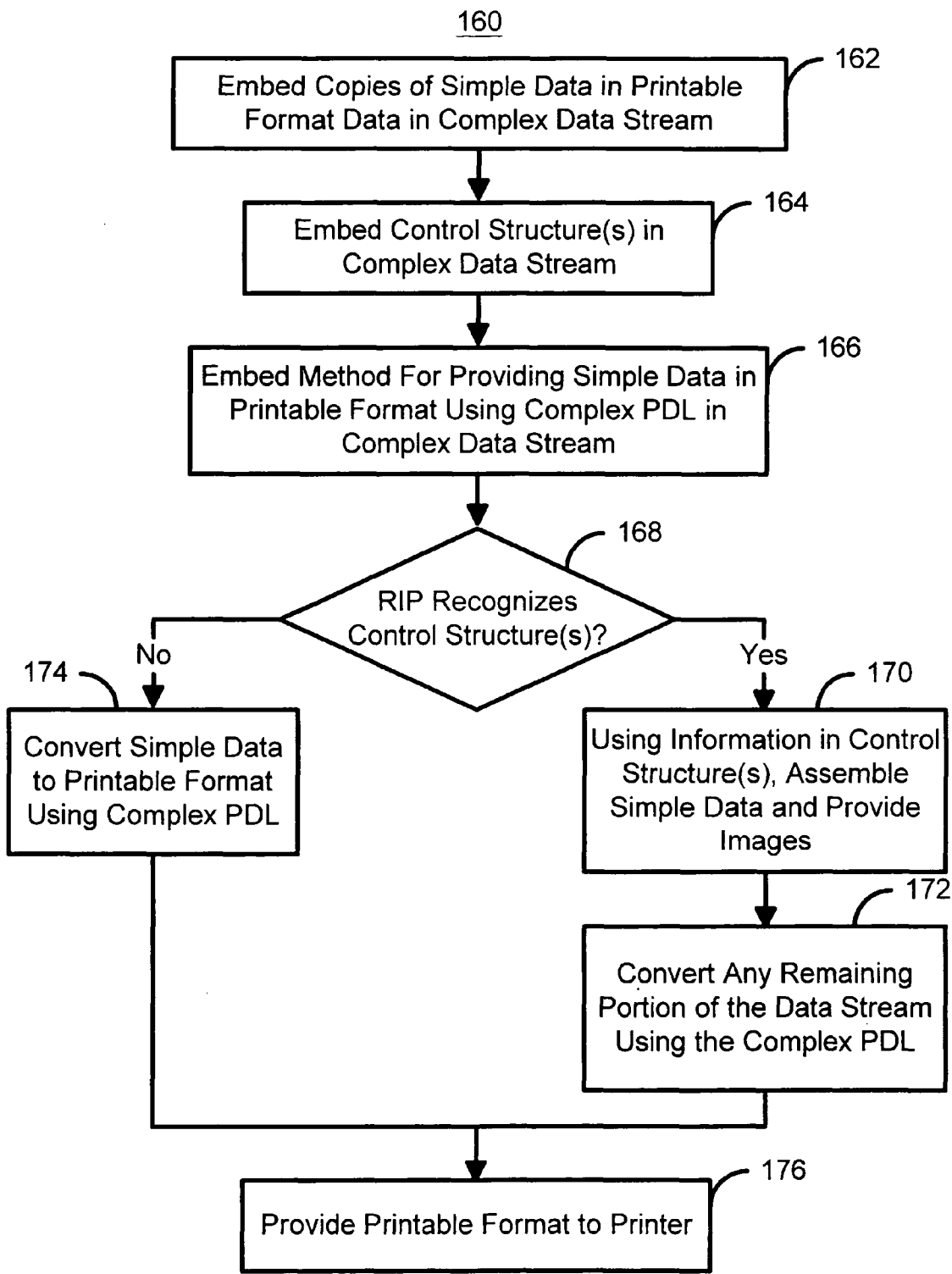
FIG. 6 is a more detailed flow chart depicting a third embodiment of a method in accordance with the present invention for printing simple data in a complex data stream.

FIG. 6 is a more detailed flow chart depicting a third embodiment of a method 160 in accordance with the present invention for printing simple data in a complex data stream. The method 160 is another embodiment of the method 100 described in FIG. 2. In addition, the method 160 can be implemented using the system 200. Referring to FIGS. 3 and 6, the method 160 essentially employs full embedding of the simple data in the complex data stream. Using the generator 210, the printable format of the simple data is embedded within the complex data stream, via step 162. Thus, the printable format of the simple data will be readily available and provided to the RIP 220. The control structure(s) for the simple data are also provided, via step 164. Thus, the locations of the printable format of the simple data, as well as other information used to extract the simple data, are provided via step 164. Furthermore, a method for providing the images using the complex PDL is also provided in the complex data stream by the generator 210, via step 166. The method provided in step 166 would be use by RIPS, such as the conventional RIP 30, which do not recognize the control structures and cannot simply extract the embedded printable format of the simple data. Preferably steps 162 through 166 are performed by the additional logic 212 in the generator 210.

It is determined whether the RIP recognizes the control structures, via step 168. If so, then the printable format of the simple data is extracted from the complex data stream, via step 170. Remaining portions of the complex data stream to be printed, if any, are converted to the printable format, via step 172. Step 172 may be performed using conventional methods of converting complex data streams in a complex PDL to a printable format. If the control structure(s) were not recognized, then the RIP being used is a conventional RIP, such as the conventional RIP 30. Consequently, the complex data stream including the simple data is converted to a printable format in a conventional manner, via step 174. In either case, the printable version of the simple data, as well as any other data, are provided to the printer 230, via step 176.

The method 160 also allows for faster printing of simple data from the complex data stream. The method 160 provides the greatest benefit when the simple data comprises the vast majority of the data in the complex data stream, as in the case of printing a scanned book. However, the method 160 can be used when smaller portions of the complex data stream, such as one or more individual pages, are made up of simple data. The method 160 does require additional work to be performed using the logic 212 of the generator, for example in providing the method used by conventional RIPs to convert the complex data stream to a printable format. However, the work done by the RIP 220 would be reduced because the RIP 220 can simply extract the printable format from the complex data stream.

Figure 7:
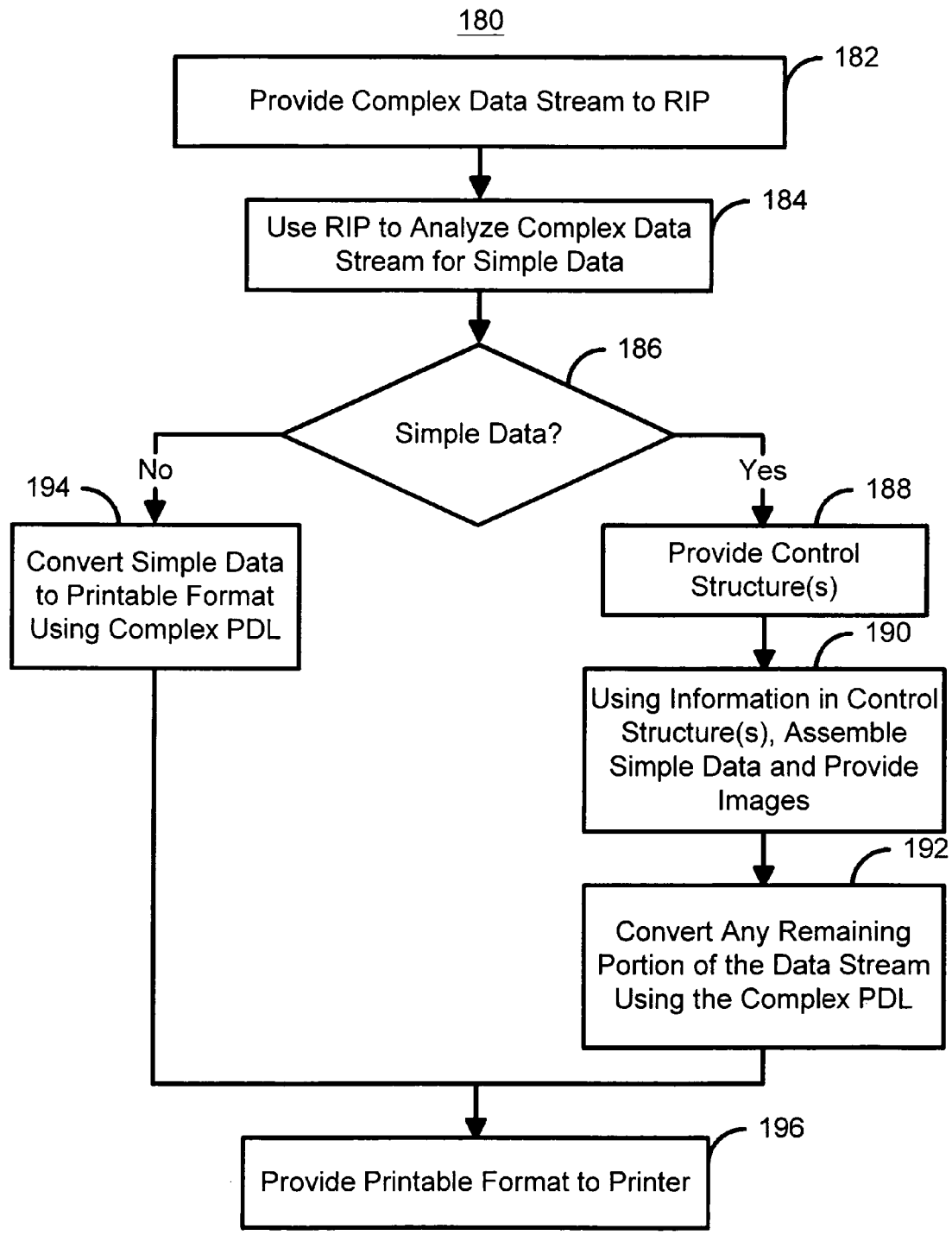
FIG. 7 is a more detailed flow chart depicting a fourth embodiment of a method in accordance with the present invention for printing simple data in a complex data stream.

FIG. 7 is a more detailed flow chart depicting a fourth embodiment of a method 180 in accordance with the present invention for printing simple data in a complex data stream. The method 180 is another embodiment of the method 100 described in FIG. 2. In addition, the method 180 can be implemented using the system 200. Referring to FIGS. 3 and 7, the method 180 essentially employs implicit embedding of the simple data. The generator 210 provides a complex data stream, via step 182. In one embodiment, the generator 210 may be very close to the conventional generator 20. In such an embodiment, the additional logic 212 is minimized. Upon receiving the complex data stream, the RIP 220 analyzes the content of the complex data stream for example using a prefilter, via step 184. For example, the RIP 220 might use the additional logic 222 in the RIP to perform the analysis. Based on the analysis performed in step 184, it is determined whether simple data is in the complex data stream provided to the RIP 220, via step 186.

If the complex data stream contains simple data, then control structures are provided, via step 188. The control structures provided in step 188 are analogous to those in the method 140, described in FIG. 5, above. The control structures inform the RIP 220 of where the simple data resides in the computer system 200, and how to form the images from the stored simple data. For example, the control structures may indicate where in the memory (not shown) of the computer system or the simple data resides, how to decompress the simple data if it is stored in a compressed form, how to construct the tiles making up each image, and whether the tiles are to be offset, scaled, and/or rotated. The control structures may also indicate the priority of data, mixing rules, how and whether transparency masks are to be used or combined. The control structures may also point to certain data in the complex PDL that is within the complex data stream. The control structures may be provided using private dictionaries in which information corresponding to key words is defined. The simple data is assembled from the specified locations and images formed using the information provided through the control structures, via step 190. Step 190 may thus include obtaining the data from the specified locations, decompressing data, placing the tiles at the appropriate offset for each image, and scaling or rotating some or all of the tiles. Remaining portions of the complex data stream to be printed, if any, are converted to the printable format, via step 192. Step 192 may be performed using conventional methods of converting complex data streams in a complex PDL to a printable format. One of ordinary skill in the art will understand, however, that the explicit building of the control structure may be skipped if the RIP 220 is an integrated RIP.

If the analysis of step 184 determines that there is no simple data in the complex data stream, or if there is no analysis performed because the RIP being used is a conventional RIP 30, then the complex data stream data is converted to a printable format in a conventional manner, via step 194. In either case, the printable version of the simple data, as well as any other data, are provided to the printer 230, via step 196.

The method 180 also allows for faster printing of simple data from the complex data stream. The method 180 provides the greatest benefit when the simple data comprises the vast majority of the data in the complex data stream, as in the case of printing a scanned book. However, the method 180 can be used when smaller portions of the complex data stream, such as one or more individual pages, are made up of simple data. The method 180 also requires little or no alterations in the conventional generator 20. However, substantial changes are used in the RIP 220. More particularly, significant changes may be required in the logic 222 including providing a mechanism for performing filtering of the incoming data stream. However, in general, all of the methods 100, 140, 160, and 180 and well as the system 300 allow simple data to be more efficiently printed from a complex data stream.

A method and system has been disclosed for more efficiently printing simple data from a complex data stream. Software written according to the present invention is to be stored in some form of computer-readable medium, such as memory, CD-ROM or transmitted over a network, and executed by a processor. Consequently, a computer-readable medium is intended to include a computer readable signal which, for example, may be transmitted over a network. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method of printing simple data within a complex datastream, the method comprising:
   receiving the complex datastream for processing, wherein the complex datastream includes simple data in a non-complex page description language (PDL) format and a copy of the simple data in a complex PDL format;
   processing the complex datastream to embed at least one control structure in the complex datastream, wherein the at least one control structure indicates to a raster image processor a location of the simple data in the non-complex PDL format;
   determining if the raster image processor recognizes the at least one control structure in the complex datastream; and
   processing the complex datastream by the raster image processor to generate a printable format by:
      converting the simple data in the non-complex PDL format to the printable format responsive to the raster image processor recognizing the at least one control structure; and
      converting the simple data in the complex PDL format to the printable format responsive to the raster image processor not recognizing the at least one control structure.

2. The method of claim 1 wherein the at least one control structure includes at least one comment indicating the simple data in the non-complex PDL format.

3. The method of claim 1 wherein the at least one control structure includes a private dictionary including at least one key word, the at least one key word indicating the simple data in the non-complex PDL format.

4. The method of claim 1 wherein processing the complex datastream to generate a printable format further comprises:
   extracting the simple data in the non-complex PDL format.

5. The method of claim 1 wherein the at least one control structure provides control information regarding the simple data in the non-complex PDL format, the control information indicating at least one location of portions of the simple data in the non-complex PDL format and providing a method for constructing at least one image of the simple data and wherein processing the complex datastream further comprises:
   assembling the portions of the simple data in the non-complex PDL format to form the at least one image.

6. The method of claim 5 wherein the portions of the simple data in the non-complex PDL format include data relating to a plurality of tiles and wherein the assembling further includes:
   obtaining the data for the plurality of tiles;
   constructing the plurality of tiles; and
   processing the plurality of tiles to provide the at least one image.

7. The method of claim 6 wherein constructing the plurality of tiles further comprises:
   decompressing a portion of the data relating to the plurality of tiles.

8. The method of claim 6 wherein processing the plurality of tiles further comprises:
   rotating a first portion of the plurality of tiles or scaling a second portion of the plurality of tiles.

9. The method of claim 1 wherein processing the complex datastream to embed at least one control structure further comprises:
   analyzing the complex data stream using the raster image processor to determine whether the simple data in the non-complex PDL format exists; and
   using the raster image processor to embed the at least one control structure in the complex data stream if the simple data in the non-complex PDL format exists.

10. The method of claim 9 wherein processing the complex datastream to generate a printable format further includes:
    extracting a second copy of the simple data in the non-complex PDL format.

11. The method of claim 1 wherein processing the complex datastream to embed at least one control structure further comprises:
    analyzing the complex data stream using the raster image processor to determine whether the simple data in the non-complex PDL format exists; and
    wherein processing the complex datastream to generate the printable format further includes:
    extracting and rasterizing the simple data in the non-complex PDL format if the simple data in the non-complex PDL format exists.

12. The method of claim 9 wherein the at least one control structure provides control information regarding the simple data in the non-complex PDL format, the control information indicating at least one location of portions of the simple data in the non-complex PDL format and providing a method for constructing at least one image of the simple data in the non-complex PDL format and wherein processing the complex datastream to generate the printable format further comprises:
    assembling the portions of the simple data in the non-complex PDL format to form the at least one image.

13. The method of claim 12 wherein the portions of the simple data in the non-complex PDL format include data relating to a plurality of tiles and wherein assembling the portions further includes:
    obtaining the data for the plurality of tiles;
    constructing the plurality of tiles; and
    processing the plurality of tiles to provide the at least one image.

14. A system operable to print simple data within a complex datastream, the system comprising:
    a generator operable to provide the complex datastream for processing, wherein the complex datastream includes simple data in a non-complex page description language (PDL) format and a copy of the simple data in a complex PDL format;
    a raster image processor operable to process the complex datastream to embed at least one control structure in the complex datastream,
    wherein the at least one control structure indicates a location to a raster image processor of the simple data in the non-complex PDL format,
    wherein the raster image processor is further operable to determine if the at least one control structure in the complex datastream is recognized and processing the complex datastream to generate a printable format by:
    converting the simple data in the non-complex PDL format to the printable format responsive to the raster image processor recognizing the at least one control structure; and
    converting the simple data in the complex PDL format to the printable format responsive to the raster image processor not recognizing the at least one control structure.

15. The system of claim 14 wherein the raster image processor converts the simple data by extracting the simple data in the non-complex PDL format.

16. The system of claim 14 wherein the at least one control structure provides control information regarding the simple data in the non-complex PDL format, the control information indicating at least one location of portions of the simple data in the non-complex PDL format and providing a method for constructing at least one image of the simple data in the non-complex PDL format and wherein the raster image processor further assembles the portions of the simple data in the non-complex PDL format to form the at least one image based upon the control information.

17. The system of claim 14 wherein the raster image processor further includes a pre-filter for analyzing the complex data stream to determine whether the simple data in the non-complex PDL format exists, and embedding the at least one control structure in the complex data stream if the simple data exists in the non-complex PDL format.

18. The system of claim 14 wherein the raster image processor further analyzes the complex data stream to determine whether the simple data in the non-complex PDL format exists, and if the simple data in the non-complex PDL format exists, extracts and rasterizes the simple data in the non-complex PDL format.

* * * * *